July 2, 1940. W. L. HOVEY 2,206,321
FISHHOOK AND SNELL
Filed Jan. 24, 1938
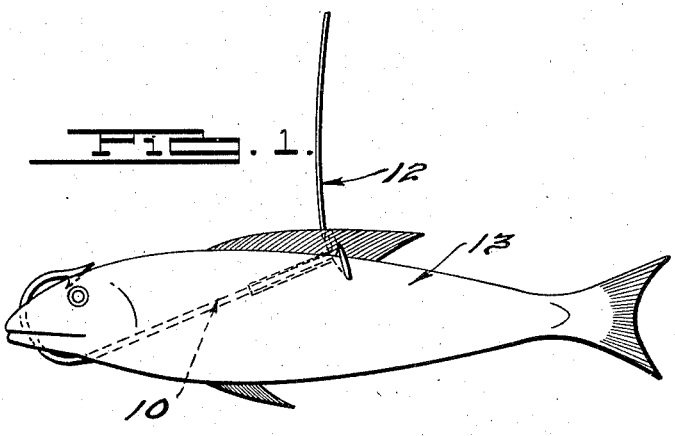
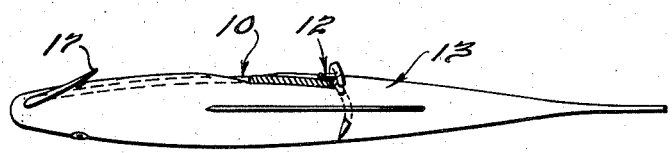
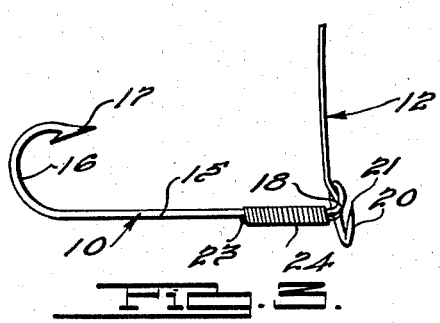 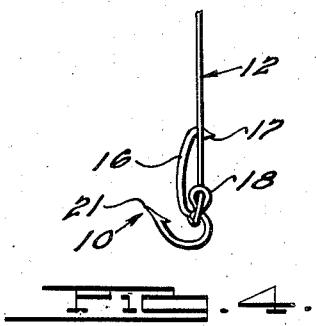
INVENTOR
William L. Hovey.
BY Harness, Dickey & Pierce.
ATTORNEYS.

Patented July 2, 1940

2,206,321

UNITED STATES PATENT OFFICE 2,206,321

FISHHOOK AND SNELL

William L. Hovey, Flint, Mich.

Application January 24, 1938, Serial No. 186,527

8 Claims. (Cl. 43—40)

The invention relates generally to angling and it has particular relation to fishhooks and snells.

In angling or fishing the use of live minnows as bait is quite universal. Generally, the minnow is attached to the hook by passing the barbed end of the latter either through the mouth of the minnow or through the back just above the back bone and under the dorsal fin. It is important that the minnow be attached to the hook in such manner that it will not be rendered inactive, as a moving minnow is more attractive as a lure to fish. While passage of the hook through the mouth of the minnow will not render it inactive, the minnow in swimming around in the water usually carries the hook or supports it and this causes the minnow to tire more quickly. Moreover, usually the hook is not in the most desired position to be taken by the fish, when it is considered that a minnow is taken head first by the fish. When the minnow is suspended by means of a hook passing just over its backbone, it generally will remain in a horizontal position and swim around, but the barb portion of the hook is not in a good position as the barb projects upwardly midway of the ends of the minnow and when a fish attempts to take the minnow head first, the shank of the hook and barb portion are generally cross-wise of the mouth of the fish. It is true that many fish are caught by attaching minnows to hooks in the manner described, but usually this is because the fish at last sufficiently takes the bait that the hook passes into the mouth of the fish. In many instances, the minnow is pulled or torn from the hook before the barb portion of the latter enters the mouth of the fish or at least before such barb portion hooks the fish. The present invention relates generally to improvements having objects as follows.

One of the principal objects of the invention is to provide an improved fishhook and snell which are so arranged and related that the shank of the hook, and hence the hook generally, may be held in substantially a horizontal position with the minnow substantially in a horizontal position and the barbed portion of the hook at the head end of the minnow.

Another object of the invention is to provide a fishhook which enables holding the minnow in a substantially horizontal position with the barbed end of the hook adjacent the head of the minnow, wherein the arrangement is such that the shank of the hook will be held in substantial alignment with the minnow.

Another object of the invention is to provide a construction for obtaining these results which can be manufactured very inexpensively.

Other objects of the invention will become apparent from the following specification, the drawing to which it relates, and from the claims hereinafter set forth.

For a better understanding of the invention, reference may be had to the drawing, wherein:

Figure 1 is a side elevational view of a fishhook and snell constructed according to one form of the invention; illustrating a minnow attached to the hook;

Fig. 2 is a top plan view of the construction shown by Fig. 1;

Fig. 3 is a view of the fishhook and snell assembly shown by Fig. 1, with the minnow removed; and Fig. 4 is an end view of the construction shown by Fig. 3, as seen from the right end thereof.

Referring to Figures 1 and 2, a fishhook, constructed according to one form of the invention is illustrated generally at 10, a snell connected thereto is indicated at 12, and a minnow attached to the hook is indicated at 13. As shown clearer by Figures 3 and 4, the shank of the hook is indicated at 15, and such shank terminates at its forward end in a hook portion 16 having a barb 17. While the hook portion 16 generally extends along the shank 10, and is substantially in the plane of the shank, it will be noted that it is angled sidewise or laterally to a certain extent. At its opposite end, the shank 15 is bent to form an eye 18, which is in a plane extending transversely to the shank of the hook and defining approximately a right angle with the shank. While the hook portion 16 and the eye portion 18 both are shown at the upper side of the shank, the hook portion might be provided at the lower side of the shank, although it is preferable to have it at the upper side, for reasons that will be made clear hereinafter. Beyond the eye 18, the wire forming the hook extends downwardly and laterally, as indicated at 20, so as to form a secondary hook, and this secondary hook terminates in a barb 21.

The snell 12, which may be constructed of gut, small copper wire, or the like, has a substantial end portion 23 laying along the under side of the shank 15 and which is bound thereto tightly by means of a wrapping of silk thread or the like 24 that subsequently may be coated with shellac, as will be readily understood. At the rearward end of the shank, the snell extends beyond the eye 18, then upwardly, and then forwardly through the eye 18, and then upward for attachment to a fishing line. It will be appreciated that the snell has substantial stiffness and that by arranging it in the manner described and shown, the shank of the hook tends to stay in a horizontal position when it is suspended by the snell. In this connection, the part 23 of the snell, laying along the under side of the hook, provides a rigidity of attachment between the snell and shank that helps in maintaining the latter horizontal, and additionally and primarily the snell, in engaging the upper part of the eye 18, acts on the latter similarly to a lever arrangement, tending constantly to move the eye portion into alignment with the upwardly projecting snell and this in turn tends to tilt the shank 15 upwardly. It will be appreciated in this connection that the eye 18 may be varied in position, such for example as by reducing the included angle between the eye and the shank so that the tendency to tilt the shank upwardly can be varied as found most desirable.

Now referring to Figures 1 and 2, the hook is attached to the minnow in the following manner. First, with the shank vertical, the barb 17 is passed upwardly through the lips of the minnow at one side of the mouth and then the shank is moved downwardly until generally aligned with the body of the minnow, and then the hook can be turned generally about the axis of the shank sufficiently to enable passing the barb 21 on the secondary hook 20 under the top fin of the minnow and just over the backbone thereof until such barb projects beyond the opposite side of the minnow. Then the hook can be turned so that the barb 21 projects upwardly.

As now arranged, the minnow is generally along the shank of the hook, with the hook portion 16 generally fitting over the head of the minnow, and the two together are generally horizontal. Moreover, the minnow is not injured seriously in applying the two hooks and may move about in the water freely. It might be added that in addition to the forces tending to keep the shank of the hook horizontal, the minnow itself will tend to remain horizontal, so that altogether the lure presented is that of a minnow swimming or moving around in a horizontal position. An important point to be considered is that the front barbed end of the hook practically fits the contour of the head of the fish and therefore is in position to be freely and immediately taken by a fish. If a fish attacks the bait or minnow, it does so from the head end of the latter, and it can be readily seen that in so doing its mouth moves over the barb part of the front hook without difficulty. Once the forward portion of the minnow is in the fish's mouth, any reverse movement immediately causes the barb to pierce the roof of the fish's mouth and thus catch the latter. It may be mentioned here that when a fish takes the bait, ordinarily it tends to tilt the forward portion of the minnow downwardly so as to move the barb towards the roof of the fish's mouth. Normally the secondary hook will not be instrumental in catching the fish and, as a matter of fact, this is not desired because then two hooks would have to be removed. The eye portion, snell, and secondary hook ordinarily will present an obstacle to movement of the fish's mouth past the central portion of the minnow's body, but even though the fish's mouth moved over the secondary hook, the barb of the latter is not in a good position to become caught as it projects transversely to the minnow body.

It will be appreciated from the foregoing that the invention generally provides an arrangement and construction which enables placing the hook generally along the body of the minnow with the hook portion generally fitting over the head of the minnow, with the barb projecting rearwardly. In other words, the hook and minnow are so arranged that any fish taking the minnow head first as fish normally will do, takes the hook portion first with the shank substantially parallel to the movement of the fish. Once the hook is in a proper position to move into the fish's mouth, the instant the head of the minnow moves into the fish's mouth, any reverse movement immediately tends to cause the barb to catch the roof of the fish's mouth. The invention is destined to make more positive the catching of fish with a single bait and to prevent a minnow being pulled from the hook without being effective in catching a fish. According to the present invention, it is practically impossible for any fish to take the minnow without at the same time taking the hook and being caught. It will be readily recognized that the invention can be manufactured inexpensively, as the entire hook may be manufactured from a single wire and the snell secured thereto in an inexpensive manner.

Although only one form of the invention has been described and illustrated in detail, it will be apparent to those skilled in the art that various modifications may be made without departing from the scope of the appended claims.

What is claimed is:

1. In combination, a fishhook having a substantially straight shank terminating at its forward end in a hook portion and at its rearward end in an eye portion that is disposed in a plane transverse to the shank, and a snell fastened at one end to the shank adjacent the eye and then extending first rearwardly of the eye and then forwardly through the eye and then upwardly with the opposite end of the snell adapted for connection with a fish line, whereby when the hook is suspended in the water engagement of the snell with the eye holds the shank of the hook substantially horizontal.

2. In combination, a fishhook having a substantially straight shank terminating at its forward end in a hook portion and at its rearward end in an eye portion that is disposed in a plane transverse to the shank, and a snell fastened at one end to the shank adjacent the eye and then extending first rearwardly of the eye and then forwardly through the eye and then upwardly with the opposite end of the snell adapted for connection with a fish line, whereby when the hook is suspended in the water engagement of the snell with the eye holds the shank of the hook substantially horizontal, said snell having substantial stiffness so that its portion passing through the eye and then upwardly tends constantly to straighten and to move the eye into alignment with the snell portion extending above the eye.

3. In combination, a fishhook having a substantially straight shank terminating at its forward end in a hook portion and at its rearward end in an eye portion that is disposed on a plane transverse to the shank and which defines substantially a right angle with the forwardly extending shank, and a snell fastened at one end to the shank adjacent the eye and then extending rearwardly of the eye and then forwardly through the eye and then upwardly with the opposite end of the snell adapted for connection with a fish line, whereby when the hook is suspended in the water engagement of the snell with the eye holds the shank of the hook substantially horizontal, said snell having substantial stiffness so that its portion passing through the eye and then upwardly tends constantly to straighten and to move the eye into alignment with the snell portion extending above the eye.

4. A fishhook comprising a shank having a hook portion at its forward end, an eye portion at the rearward end of the shank and disposed in a plane transverse to the shank, and a hook portion projecting laterally of the shank adjacent the eye portion, and arranged for hooking engagement with a bait, said last mentioned hook portion and eye portion being displaced relatively circumferentially of the shank.

5. In combination, a fishhook having a shank portion terminating at its forward end in a hook portion, an eye portion at the rearward end of the hook and which is disposed in a plane transverse to the shank, a second hook portion projecting from the rearward end of the shank and which is disposed in a plane transverse to the shank, and a substantially stiff snell fastened at one end to the shank adjacent the eye and which extends rearwardly of the eye, then forwardly through the eye, and then upwardly for attachment to a fishing line.

6. A fishhook comprising a wire shank terminating at one end in a barbed hook portion generally in the plane of the shank, and at its other end in a barbed portion disposed in a plane transverse to and substantially at right angles to the shank, the first barbed portion being adapted to be hooked through the mouth of a bait fish, the shank being adapted to lay along the body of the bait and the second barbed portion being adapted to be hooked laterally through a part of the body of the bait over its backbone.

7. A fishhook comprising a wire shank terminating at one end in a barbed hook portion generally in the plane of the shank and at its other end in a barbed and curved hook portion which projects laterally of the shank and is disposed in a plane transverse to and substantially at right angles to the shank.

8. A fishhook comprising a wire shank terminating at one end in a barbed hook portion generally in the plane of the shank and at its other end in a barbed and curved hook portion which projects laterally of the shank substantially at a right angle thereto and substantially at a right angle to the plane of the first hook portion.

WILLIAM L. HOVEY.